(12) United States Patent
Suzuki

(10) Patent No.: US 10,230,323 B2
(45) Date of Patent: Mar. 12, 2019

(54) MOTOR DRIVE DEVICE

(71) Applicant: NTN CORPORATION, Osaka (JP)

(72) Inventor: Kenichi Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/843,554

(22) Filed: Dec. 15, 2017

(65) Prior Publication Data

US 2018/0109222 A1 Apr. 19, 2018

Related U.S. Application Data

(63) Continuation of application No. PCT/JP2016/069339, filed on Jun. 29, 2016.

(30) Foreign Application Priority Data

Jul. 2, 2015 (JP) .................................. 2015-133449

(51) Int. Cl.
*G01R 31/34* (2006.01)
*B60K 6/00* (2006.01)
(Continued)

(52) U.S. Cl.
CPC .............. *H02P 29/60* (2016.02); *H02K 7/116* (2013.01); *H02K 11/25* (2016.01); *B60K 6/365* (2013.01)

(58) Field of Classification Search
None
See application file for complete search history.

(56) References Cited

U.S. PATENT DOCUMENTS 7,959,534 B2 *  6/2011  Kasuga .................. B60K 6/365
                                                              477/3
8,160,773 B2     4/2012  Nabeshima et al.
(Continued)

FOREIGN PATENT DOCUMENTS

EP    2 684 731 A1    1/2014
EP    2 783 896 A1    10/2014
(Continued)

OTHER PUBLICATIONS

International Search Report dated Sep. 20, 2016 in corresponding International Patent Application No. PCT/JP2016/069339.
(Continued)

*Primary Examiner* — Bentsu Ro
*Assistant Examiner* — Zemenay Truneh

(57) ABSTRACT

A lubricating oil temperature sensor to detect a temperature of a lubricating oil is provided in a lubricating oil passage in a speed reducer, a coil temperature sensor to detect a temperature of a motor coil is provided in a stator of an electric motor, and a rotation speed detection sensor to detect a rotation speed of the electric motor is provided. A control device includes: an abnormality detector to detect an abnormality in the lubricating oil temperature sensor; and a lubricating oil temperature estimator to estimate the temperature of the lubricating oil on the basis of a determined relationship using the temperature detected by the coil temperature sensor and the rotation speed detected by the rotation speed detection sensor, when the abnormality detector detects the abnormality in the lubricating oil temperature sensor.

5 Claims, 7 Drawing Sheets

(51) Int. Cl.
*H02P 29/60* (2016.01)
*H02K 11/25* (2016.01)
*H02K 7/116* (2006.01)
*B60K 6/365* (2007.10)

(56) References Cited

U.S. PATENT DOCUMENTS

| | | |
|---|---|---|
| 8,701,803 B2 | 4/2014 | Ozaki |
| 9,321,353 B2 | 4/2016 | Ozaki |
| 9,701,204 B2 | 7/2017 | Suzuki |
| 2010/0187044 A1 | 7/2010 | Nabeshima et al. |
| 2013/0341109 A1 | 12/2013 | Ozaki |
| 2014/0330471 A1 | 11/2014 | Ozaki |
| 2015/0224868 A1 | 8/2015 | Makino |
| 2016/0204679 A1 | 7/2016 | Yamada |
| 2016/0332521 A1 | 11/2016 | Suzuki |

FOREIGN PATENT DOCUMENTS

| | | |
|---|---|---|
| JP | 2008-168790 | 7/2008 |
| JP | 2010-173407 | 8/2010 |
| JP | 2015-64048 | 4/2015 |
| JP | 2015-105696 | 6/2015 |
| JP | 2015-142415 | 8/2015 |
| JP | 2016-96594 | 5/2016 |
| WO | WO 2014/069280 A1 | 5/2014 |
| WO | WO 2015/045903 A1 | 4/2015 |

OTHER PUBLICATIONS

English Translation of the International Preliminary Report on Patentability for the International Patent Application No. PCT/JP2016/069339, dated Jan. 11, 2018, 6 pages.

Extended European Search Report dated Dec. 19, 2018 in European Patent Application No. 16817989.3.

* cited by examiner

ENLARGED PORTION A

SENSOR ABNORMALITY DETERMINAITON EXAMPLE

US 10,230,323 B2

MOTOR DRIVE DEVICE

CROSS REFERENCE TO THE RELATED APPLICATION

This application is a continuation application, under 35 U.S.C. § 111(a), of international application No. PCT/JP2016/069339, filed Jun. 29, 2016, which is based on and claims Convention priority to Japanese patent application No. 2015-133449, filed Jul. 2, 2015, the entire disclosure of which is herein incorporated by reference as a part of this application.

BACKGROUND OF THE INVENTION

Field of the Invention

The present invention relates to a motor drive device and relates to a failsafe technology to estimate a temperature of a lubricating oil when a lubricating oil temperature sensor is abnormal.

Description of Related Art

As a motor drive device, there is an in-wheel motor drive device including a speed reducer (or reduction gear), a motor, and a wheel bearing. The following technologies (1) to (4) to perform output limitation of the motor on the basis of sensor output or the like in the in-wheel motor drive device have been proposed.

(1) As a technology capable of easily confirming an overload state of an in-wheel motor, a technology has been proposed in which the temperature of a unit including a wheel bearing, a motor, and a speed reducer is estimated by measuring the temperature of any of a motor stator, a motor rotor, a lubricating oil, and a motor case, and output limitation of the motor is performed at the time when a time-differential value of the estimated temperature exceeds a specified value. In addition, an amount of generated heat or an amount of released heat is estimated from an inlet temperature, an outlet temperature, a flow rate, and a specific heat, occurrence of an abnormality is determined at the time when the estimated amount deviates from a certain reference value, and then output limitation of the motor is performed (Patent Document 1).

(2) As a technology to more accurately detect the temperature of the lubricating oil flowing out from the speed reducer, a temperature sensor is disposed in a lubricating oil tank or in a discharge oil passage through which the lubricating oil is discharged from a speed-reducing portion to the lubricating oil tank, and output limitation of the motor is performed when the temperature of the lubricating oil becomes equal to or higher than a certain specified value (Patent Document 2).

(3) A sensor for measuring the temperature of the lubricating oil of the in-wheel motor drive device and a sensor for measuring a coil temperature of a motor stator are provided, and output limitation of the motor is performed at the time when the measured temperature value of any of the sensors exceeds a first threshold and further exceeds a second threshold (JP Laid-open Patent Publication No. 2015-142415).

(4) As a technology to perform detection of an abnormality in a motor coil and a technology to handle an abnormality when the abnormality is detected, output limitation of the motor is performed with, as a reference, a detected value at a drive wheel of two wheels that is different from a wheel at which an abnormality has occurred (JP Laid-open Patent Publication No. 2016-096594).

RELATED DOCUMENT

Patent Document

[Patent Document 1] JP Laid-open Patent Publication No. 2008-168790
[Patent Document 2] JP Laid-open Patent Publication No. 2015-64048

In the conventional technologies (1), (2), and (3), the temperature of the lubricating oil or the motor coil is measured, and output limitation of the motor is performed when the measured value is not less than a threshold, but how to handle an abnormality in the sensor itself when the abnormality occurs is not described. In the conventional technology (4), it is stated that the detected value of the sensor (at the wheel of the two drive wheels at which occurrence of an abnormality has not been determined), different from the sensor that has been detected to be abnormal, is used as a substitute measured value, and control is performed such that output equal to or higher than the measured value is not inputted. However, it describes only about the motor coil temperature, not about the lubricating oil.

As described above, measuring an individual temperature such as a motor coil temperature, a motor rotor temperature, a lubricating oil temperature, and a housing temperature, etc. and performing output limitation at the time when each of their measured temperatures becomes equal to or higher than a threshold, has been variously proposed. However, how to handle an abnormality in any sensor when the abnormality occurs, particularly, how to handle an abnormality in a lubricating oil temperature sensor, for measuring the temperature of the lubricating oil, when the abnormality occurs, is not described in any of the conventional technologies. When an abnormality occurs in the lubricating oil temperature sensor as described above, accurate oil temperature detection cannot be performed in an overload region of the speed reducer, and there is a possibility that an abnormality occurs in the speed reducer.

SUMMARY OF THE INVENTION

An object of the present invention is to provide a motor drive device that is able to estimate a temperature of a lubricating oil when a lubricating oil temperature sensor is abnormal, and thus allows a vehicle, in which the motor drive device is provided, to safely move to a location where repair thereof is possible, or the like, on the basis of the estimated temperature.

Hereinafter, in order to facilitate understanding of the present invention, the present invention will be described with reference to the reference numerals in embodiments for the sake of convenience.

A motor drive device of the present invention is including: an electric motor 1; a speed reducer 2 configured to reduce a speed of rotation of the electric motor 1 and transmit so reduced rotation to a wheel; a lubricating oil supply mechanism Jk configured to supply a lubricating oil to the speed reducer 2; and a control device U1 configured to control the electric motor 1, wherein a lubricating oil temperature sensor Sb configured to detect a temperature of the lubricating oil is provided in a lubricating oil passage 29 in the speed reducer 2, a coil temperature sensor Sa configured to detect a temperature of a motor coil 78 is provided in a stator 9 of the electric motor 1, and a rotation speed detection sensor Sc configured to detect a rotation speed of the electric motor 1 is provided, and the control device U1 includes an abnormality detector 41 configured to detect an abnormality in the lubricating oil temperature sensor Sb, and a lubricating oil temperature estimator 42 configured to estimate the temperature of the lubricating oil on the basis of a determined relationship using the temperature detected by the coil temperature sensor Sa and the rotation speed detected by the rotation speed detection sensor Sc, when the abnormality detector 41 detects the abnormality in the lubricating oil temperature sensor Sb.

The determined relationship is determined on the basis of the results of a test, simulation, or the like. In the specification, the "rotation speed" is synonymous with a number of rotations per unit time. Hereinafter, the number of rotations per unit time is sometimes referred to merely as "number of rotations".

According to this configuration, the lubricating oil temperature sensor Sb detects the temperature of the lubricating oil present in the lubricating oil passage 29 in the speed reducer 2 when the lubricating oil temperature sensor Sb is in a normal state. Here, the purpose of providing the lubricating oil temperature sensor Sb is to prevent overload operation of the speed reducer 2 by recognizing, checking or obtaining the temperature state of the speed reducer 2. The abnormality detector 41 detects an abnormality in the lubricating oil temperature sensor Sb. When the lubricating oil temperature sensor Sb is abnormal, the lubricating oil temperature estimator 42 estimates the temperature of the lubricating oil on the basis of the determined relationship using the coil temperature detected by the coil temperature sensor Sa and the rotation speed detected by the rotation speed detection sensor Sc. The estimated temperature is necessary and sufficient to recognize, check or obtain the temperature state of the speed reducer 2, although the accuracy thereof is lower than the detection accuracy of the temperature detected by the lubricating oil temperature sensor Sb when the lubricating oil temperature sensor Sb is in a normal state. Even when an abnormality occurs in the lubricating oil temperature sensor Sb, overload operation of the speed reducer 2 can be prevented by obtaining the temperature state of the speed reducer 2 through the temperature estimated by the lubricating oil temperature estimator 42. Therefore, a vehicle in which this motor drive device is provided is allowed to safely move to a location where repair thereof is possible, or the like.

The abnormality detector 41 may determine that the lubricating oil temperature sensor Sb is abnormal, when the temperature of the lubricating oil detected by the lubricating oil temperature sensor Sb deviates from a range between determined temperature upper and lower limits (preferably, inclusive). The determined temperature upper limit and lower limit are determined on the basis of the results of a test, simulation, or the like.

As the lubricating oil temperature sensor Sb, for example, a sensor using a resistor is used. The sensor detects a change in the temperature of the resistor, with a voltage value, when a constant current is applied thereto. In abnormality detection for a wire breakage that is a representative example of a mechanical abnormality in a sensor, when the temperature of the lubricating oil is higher than the determined temperature upper limit or lower than the determined temperature lower limit, it is determined that a wire breakage is present in the sensor.

The lubricating oil temperature estimator 42 may estimate the temperature of the lubricating oil when the rotation speed of the electric motor 1 detected by the rotation speed detection sensor Sc is not less than a determined rotation speed. Such determined rotation speed is determined on the basis of the results of a test, simulation, or the like.

Loss of the motor drive device is obtained by combining losses of each portion. Regarding the loss of the speed reducer 2, for example, rolling resistance of a bearing portion and sliding resistance of a sliding portion are main losses, and both are depending on a number of rotations if bearing specifications and a gap within the speed reducer are determined. In addition, regarding the loss of the electric motor 1, iron loss, copper loss, and mechanical loss are main losses. The copper loss depends on a coil current, the iron loss depends on the coil current and a number of rotations, and the mechanical loss depends on the number of rotations. Thus, regarding the loss in a low-rotation and high-torque region, the copper loss occupies a large part of the loss; and in a high-rotation and low-torque region, the iron loss and the mechanical loss in the speed reducer occupy a large part of the loss. Accordingly, a situation where the speed reducer is in an overload state and is thermally disadvantageous arises in the entirety of the high-speed region. Therefore, when the rotation speed is not less than the determined rotation speed, where the speed reducer 2 is considered to be in a thermally disadvantageous situation, the temperature of the lubricating oil is estimated, whereby the temperature state of the speed reducer 2 can be obtained in a detailed manner. Accordingly, overload operation of the speed reducer 2 can be prevented.

The lubricating oil temperature estimator 42 may estimate the temperature of the lubricating oil by multiplying the temperature of the motor coil 78, detected by the coil temperature sensor Sa, by a correction value corresponding to the rotation speed, detected by the rotation speed detection sensor Sc. The correction value is determined on the basis of the results of a test, simulation, or the like.

In addition, the lubricating oil temperature estimator 42 may have a correction map that determines the correction value corresponding to the rotation speed detected by the rotation speed detection sensor Sc, and may estimate the temperature of the lubricating oil by adding the correction value in the correction map to the temperature of the motor coil 78 detected by the coil temperature sensor Sa. The correction value is determined on the basis of the results of a test, simulation, or the like.

The control device U1 may include a motor output limiter 49 configured to limit a current of the electric motor 1 when the temperature of the lubricating oil estimated by the lubricating oil temperature estimator 42 exceeds a threshold. The threshold is determined on the basis of the results of a test, simulation, or the like. In this case, occurrence of overload in the electric motor 1 can be prevented, and also a rise in the temperature of the lubricating oil can be inhibited to prevent occurrence of an abnormality in the speed reducer 2 in advance.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
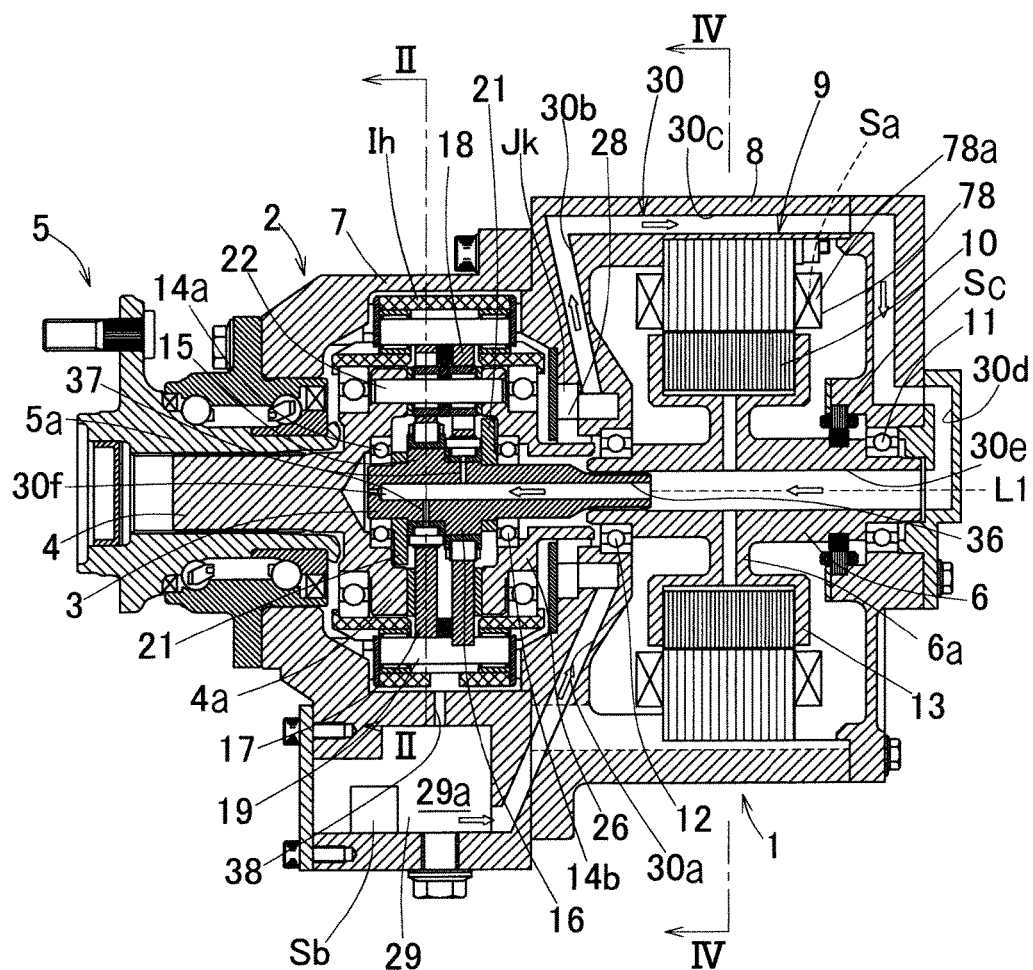
FIG. 1 is a longitudinal sectional view of a motor drive device according to an embodiment of the present invention.

A motor drive device according to an embodiment of the present invention will be described with reference to FIGS. 1 to 9. As shown in FIG. 1, the motor drive device includes an electric motor 1 for driving a wheel, a speed reducer 2 for reducing the speed of rotation of the electric motor 1, and a wheel bearing 5 that is rotated by an output member 4 that is coaxial with an input shaft 3 (referred to as speed reducer input shaft 3) of the speed reducer 2. The electric motor 1, the speed reducer 2, and the wheel bearing 5 are integrally assembled with each other to form an in-wheel motor drive device, and the in-wheel motor drive device is partly or entirely disposed within the wheel. The motor drive device that is the in-wheel motor drive device further includes a lubricating oil supply mechanism Jk and a control device U1 (FIG. 6).

The speed reducer 2 is interposed between the wheel bearing 5 and the electric motor 1, and coaxially connects a hub of the wheel that is a drive wheel supported by the wheel bearing 5, a motor rotation shaft 6 of the electric motor 1, the speed reducer input shaft 3, and the output member 4. A suspension that is in a vehicle and not shown is connected to a speed reducer housing 7 that houses the speed reducer 2. In this specification, the side of the vehicle that is closer to the outer side in a vehicle width direction in a state where the motor drive device is provided to each wheel of the vehicle is referred to as outboard side, and the side of the vehicle that is closer to the center of the vehicle in the vehicle width direction in such a state is referred to as inboard side.

The electric motor 1 is an IPM motor (so-called interior magnet synchronous motor) in which a radial gap is provided between a motor stator 9 fixed to a motor housing 8 and a motor rotor 10 mounted on the motor rotation shaft 6. Bearings 11 and 12 are provided in the motor housing 8 so as to be spaced apart from each other in the axial direction of the motor rotation shaft 6. The motor rotation shaft 6 is rotatably supported by the bearings 11 and 12.

The motor rotation shaft 6 transmits driving force of the electric motor 1 to the speed reducer 2. A flange portion 6a is provided in the vicinity of an axially intermediate portion of the motor rotation shaft 6 so as to extend radially outward. A rotor fixing member 13 is provided on the flange portion 6a, and the motor rotor 10 is mounted on the rotor fixing member 13.

The speed reducer input shaft 3 extends at an axial end thereof into the motor rotation shaft 6 to be spline-fitted to the motor rotation shaft 6. A bearing 14a is fitted into a cup portion 4a of the output member 4, and a bearing 14b is fitted into a tubular connection member 26 that is connected to the cup portion 4a via inner pins 22. A shaft obtained by integrating the speed reducer input shaft 3 and the motor rotation shaft 6 is rotatably supported by the bearings 14a, 14b, 11, and 12. Eccentric portions 15 and 16 are provided on the outer circumferential surface of the speed reducer input shaft 3 within the speed reducer housing 7. The eccentric portions 15 and 16 are provided whose phase are 180° shifted from each other, such that the centrifugal forces caused by eccentric motions of the eccentric portions 15 and 16 can be cancelled by each other.

The speed reducer 2 is a cycloidal speed reducer including an outer pin housing Ih, the speed reducer input shaft 3, curvilinear plates 17 and 18, a plurality of outer pins 19, the inner pins 22, and a counterweight 21.

Figure 2:
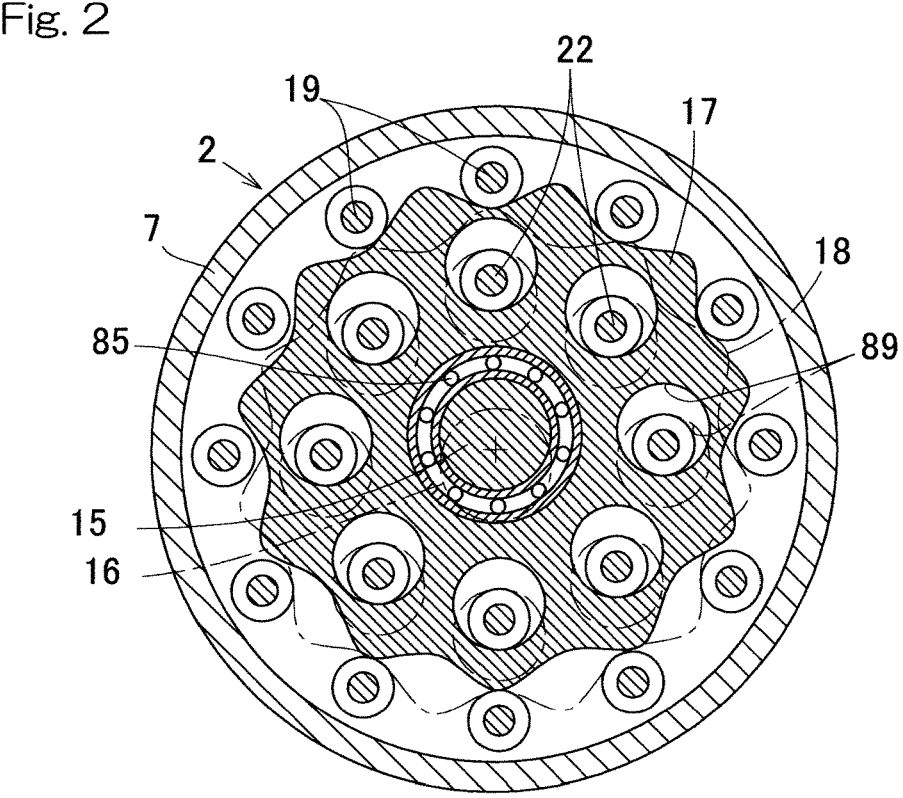
FIG. 2 is a cross-sectional view of a speed reducer portion taken along the line II-II in FIG. 1.

FIG. 2 is a cross-sectional view of a speed reducer portion taken along the line II-II in FIG. 1. In the speed reducer 2, the two curvilinear plates 17 and 18 each having an outer contour defined by a smoothly corrugated trochoidal curve are mounted via bearings 85 to the eccentric portions 15 and 16, respectively. The plurality of outer pins 19 that guide the eccentric motions of the respective curvilinear plates 17 and 18 (at their outer circumferential side) are provided in the outer pin housing Ih that is located within the speed reducer housing 7, and a plurality of the inner pins 22 mounted to the cup portion 4a (FIG. 1) are engaged in an inserted manner with a plurality of circular through holes 89 that are provided within the respective curvilinear plates 17 and 18.

Figure 3:
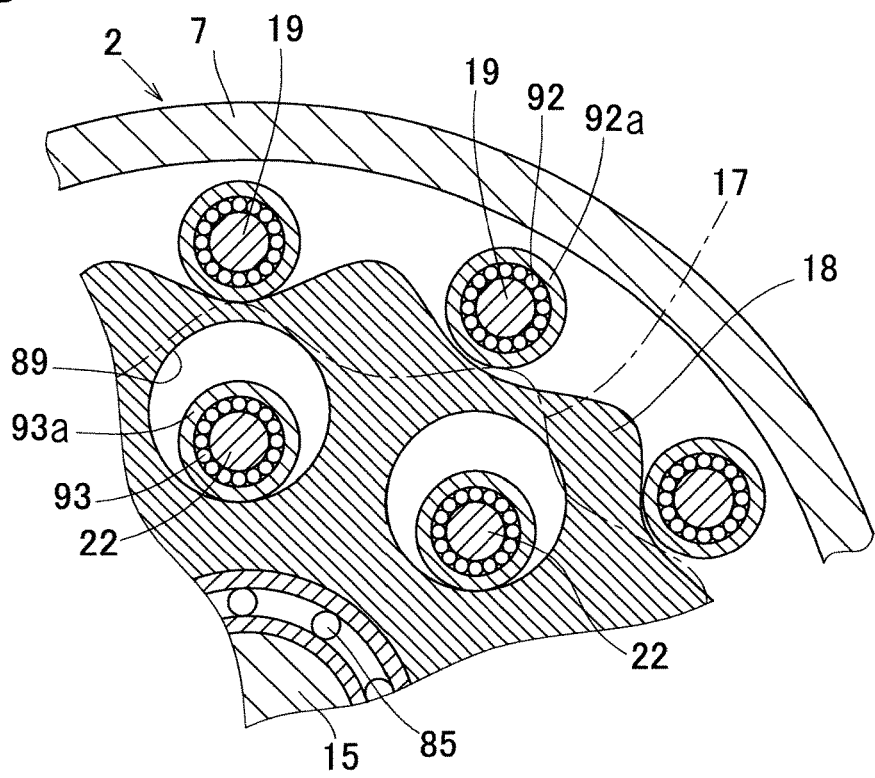
FIG. 3 is a partially enlarged view of FIG. 2.

As shown in an enlarged manner in FIG. 3, needle roller bearings 92 and 93 are mounted on each outer pin 19 and each inner pin 22, respectively. Each outer pin 19 is supported at opposite ends thereof by the needle roller bearings 92, and is in rolling contact with the outer peripheral surfaces of the respective curvilinear plates 17 and 18 via later-described outer rings 92a. At each inner pin 22, outer rings 93a of the needle roller bearings 93 reduce contact resistance against the outer peripheries of the respective curvilinear plates 17 and 18 and contact resistance between each inner pin 22 and the inner periphery of each through hole 89. The outer ring 92a of each needle roller bearing 92 is fitted and fixed to the outer pin housing Ih.

Accordingly, as shown in FIG. 1, the eccentric motions of the respective curvilinear plates 17 and 18 can be smoothly transmitted as rotary motions to an inner member 5a of the wheel bearing 5. When the motor rotation shaft 6 rotates, the respective curvilinear plates 17 and 18, which are provided on the speed reducer input shaft 3 that co-rotates with the motor rotation shaft 6, make eccentric motions. At this time, each outer pin 19 is engaged with the outer peripheral surfaces of the respective curvilinear plates 17 and 18 that make the eccentric motions, so as to be in rolling contact therewith. Simultaneously with this, only rotation motions of the respective curvilinear plates 17 and 18 are transmitted to the output member 4 and the inner member 5*a* by rotary motion, due to the engagement between each inner pin 22 and each through hole 89 (FIG. 3). The speed of the rotation of the inner member 5*a* is reduced as compared to that of the rotation of the motor rotation shaft 6.

The lubricating oil supply mechanism Jk in FIG. 1 is an axial oil supply mechanism that supplies a lubricating oil to be used for both lubrication of the speed reducer 2 and cooling of the electric motor 1, through the interior of the motor rotation shaft 6. The lubricating oil supply mechanism Jk includes a lubricating oil passage 29, a supply oil passage 30, a discharge oil passage 38, and a pump 28. The lubricating oil passage 29 is an oil passage within the speed reducer housing 7 in the speed reducer 2. The lubricating oil passage 29 includes a lubricating oil tank 29*a*. The lubricating oil tank 29*a* is provided in a lower portion of the speed reducer housing 7, serves to store the lubricating oil, and communicates with a lower portion of the motor housing 8.

The supply oil passage 30 is an oil passage through which the lubricating oil is supplied from the lubricating oil tank 29*a* to the electric motor 1 and the speed reducer 2. The supply oil passage 30 includes a suction side oil passage 30*a*, a discharge side oil passage 30*b*, a housing outer peripheral side oil passage 30*c*, a communication passage 30*d*, a motor rotation shaft oil passage 30*e*, and a speed reducer oil passage 30*f*. The suction side oil passage 30*a* communicates with and extends between a suction port in the lubricating oil tank 29*a* and a suction port of the pump 28 and is formed by the lower portion of the speed reducer housing 7 and the lower portion of the motor housing 8. The discharge side oil passage 30*b* communicates with a discharge port of the pump 28 and extends within the motor housing 8 substantially along the radially outward direction.

The housing outer peripheral side oil passage 30*c* communicates with the discharge side oil passage 30*b* and extends from the outboard side to the inboard side within the motor housing 8 along the axial direction. The communication passage 30*d* is formed at the inboard side end of the motor housing 8, an inflow port of the communication passage 30*d* communicates with the housing outer peripheral side oil passage 30*c*, and an outflow port of the communication passage 30*d* communicates with the motor rotation shaft oil passage 30*e*.

The motor rotation shaft oil passage 30*e* is provided along the axis within the motor rotation shaft 6. Part of the lubricating oil introduced from the communication passage 30*d* to the motor rotation shaft oil passage 30*e* flows via through holes extending radially outward in the motor rotation shaft 6 and the flange portion 6*a* and passes through oil passages formed within the rotor fixing member 13 so as to extend radially outward, whereby the motor rotor 10 is cooled. Furthermore, the lubricating oil is discharged from oil outlets of the oil passages to the inner circumferential surface of each coil end 78*a* by the centrifugal force of the motor rotor 10 and the pressure of the pump 28, whereby motor coils 78 are cooled.

The speed reducer oil passage 30*f* is provided in the speed reducer 2 and supplies the lubricating oil to the speed reducer 2. The speed reducer oil passage 30*f* includes an input shaft oil passage 36 and an oil supply port 37. The input shaft oil passage 36 communicates with the motor rotation shaft oil passage 30*e* and extends from an inboard side end to the outboard side within the speed reducer input shaft 3 in the axial direction. The oil supply port 37 extends radially outward from an axial position(s) (there are two locations in FIG. 1) on the input shaft oil passage 36 at which the eccentric portions 15 and 16 are provided. The discharge oil passage 38 through which the lubricating oil that has lubricated the speed reducer 2 is discharged to the lubricating oil tank 29*a* is provided in the speed reducer housing 7.

The pump 28 sucks up the lubricating oil stored in the lubricating oil tank 29*a*, through the suction port within the lubricating oil tank 29*a* via the suction side oil passage 30*a*, and circulates the lubricating oil subsequently, via the discharge side oil passage 30*b*, the housing outer peripheral side oil passage 30*c*, and the communication passage 30*d*, to the motor rotation shaft oil passage 30*e* and the speed reducer oil passage 30*f*. The pump 28 is coaxially disposed between the electric motor 1 and the speed reducer 2. The pump 28 is, for example, a cycloidal pump including: an inner rotor that rotates due to rotation of the output member 4; an outer rotor that rotates with rotation of the inner rotor in a following manner; a pump chamber; a suction port; and a discharge port (which are not shown).

When the inner rotor rotates due to rotation of the output member 4 that is driven by the electric motor 1, the outer rotor rotates in a following manner. The inner rotor and the outer rotor are configured to rotate about different rotation axes at this time, so that the volume of the pump chamber is continuously changed. Due to the volume change, the lubricating oil stored in the lubricating oil tank 29*a* is sucked up from the suction port via the suction side oil passage 30*a*, flows in through the suction port, and is pressure-fed through the discharge port subsequently to the discharge side oil passage 30*b*, the housing outer peripheral side oil passage 30*c*, and the communication passage 30*d*.

The lubricating oil is introduced from the communication passage 30*d* to the motor rotation shaft oil passage 30*e*. Part of the lubricating oil cools the motor rotor 10 and the motor coils 78 as described above, then moves downward in the motor housing 8 due to gravity, and flows into the lubricating oil tank 29*a*, which communicates with the lower portion of the motor housing 8.

The lubricating oil introduced from the motor rotation shaft oil passage 30*e* via the input shaft oil passage 36 to the oil supply port 37 is discharged through an outer radius side opening end of the oil supply port 37. The lubricating oil moves radially outward within the speed reducer housing 7, while lubricating each portion within the speed reducer 2, due to the centrifugal force and the pressure of the pump 28 being applied to the lubricating oil. Thereafter, the lubricating oil moves downward due to gravity and is stored in the lubricating oil tank 29*a* through the discharge oil passage 38.

Sensors will be described. In the motor drive device, a lubricating oil temperature sensor Sb, a coil temperature sensor Sa, and a rotation speed detection sensor Sc are provided. The lubricating oil temperature sensor Sb is a sensor for detecting the temperature of the lubricating oil present in the lubricating oil passage 29 of the speed reducer 2, and is provided within the lubricating oil tank 29*a* in this example. The purpose of providing the lubricating oil temperature sensor Sb is to prevent overload operation of the speed reducer 2 by obtaining the temperature state of the speed reducer 2. For the lubricating oil temperature sensor Sb and the coil temperature sensor Sa described later, for example, a thermistor is used as a sensor using a resistor. Specifically, the sensor detects a change in the temperature of the resistor, with a voltage value, when a constant current is applied thereto.

Figure 4:
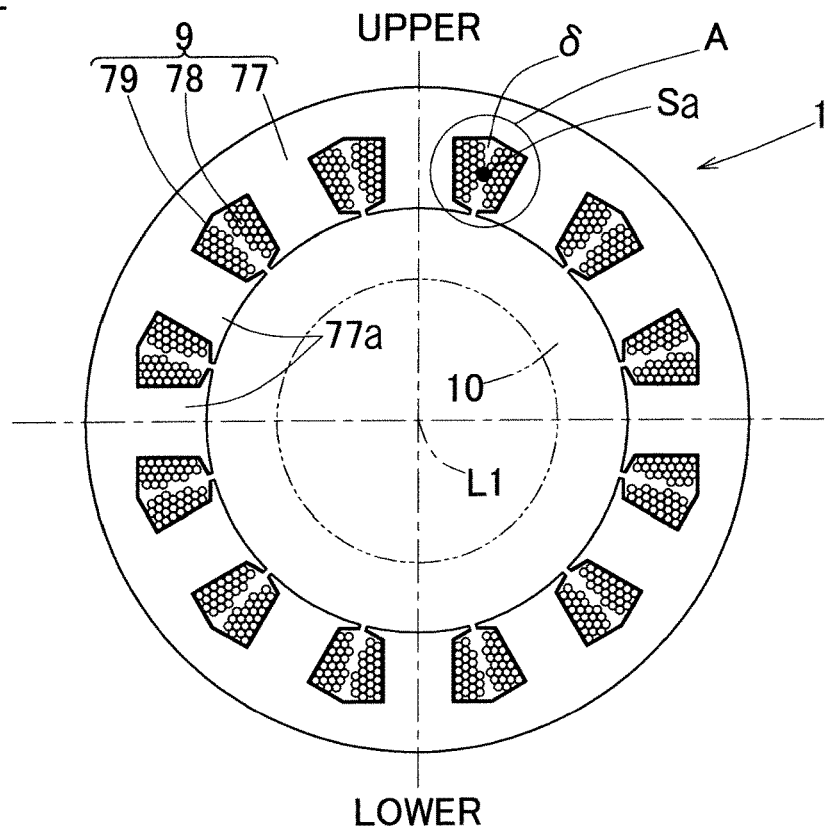
FIG. 4 is a cross-sectional view of a motor portion taken along the line IV-IV in FIG. 1.

The coil temperature sensor Sa for detecting the temperature of the motor coils 78 is provided in the motor stator 9 of the electric motor 1. The coil temperature sensor Sa monitors the temperature of the motor coils 78 such that the temperature of the motor coils 78 does not exceed the heat-resistant temperature thereof. FIG. 4 is a cross-sectional view of a motor portion taken along the line IV-IV in FIG. 1. The motor rotor 10 of the electric motor 1 includes, for example, a core portion (not shown) formed from a soft magnetic material and permanent magnets (not shown) embedded in the core portion. For example, neodymium-based magnets are used as the permanent magnets.

The motor stator 9 of the electric motor 1 includes, for example, a stator core portion 77 formed from a soft magnetic material, the motor coils 78, and insulating members 79. The stator core portion 77 has a ring shape with an outer peripheral surface that is circular in a cross-section, and a plurality of teeth 77a are formed on the inner peripheral surface thereof so as to project at the inner diameter side and be aligned in the circumferential direction thereof. The motor coils 78 are wound on the respective teeth 77a of the stator core portion 77. The lubricating oil is discharged and sprayed from the lubricating oil supply mechanism Jk (FIG. 1) to the coil ends 78a (FIG. 1) projecting at the inboard side and the outboard side over the width of the stator core portion 77, of the motor coils 78 wound on the respective teeth 77a.

Figure 5:
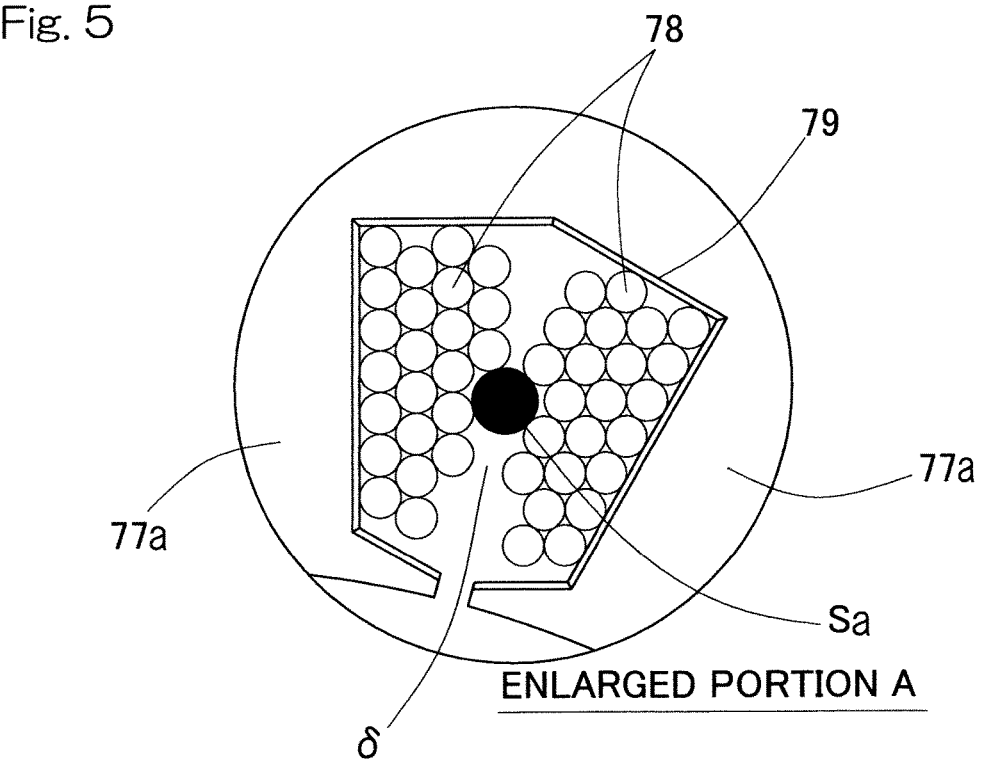
FIG. 5 is an enlarged view of a portion A in FIG. 4.
Figure 6:
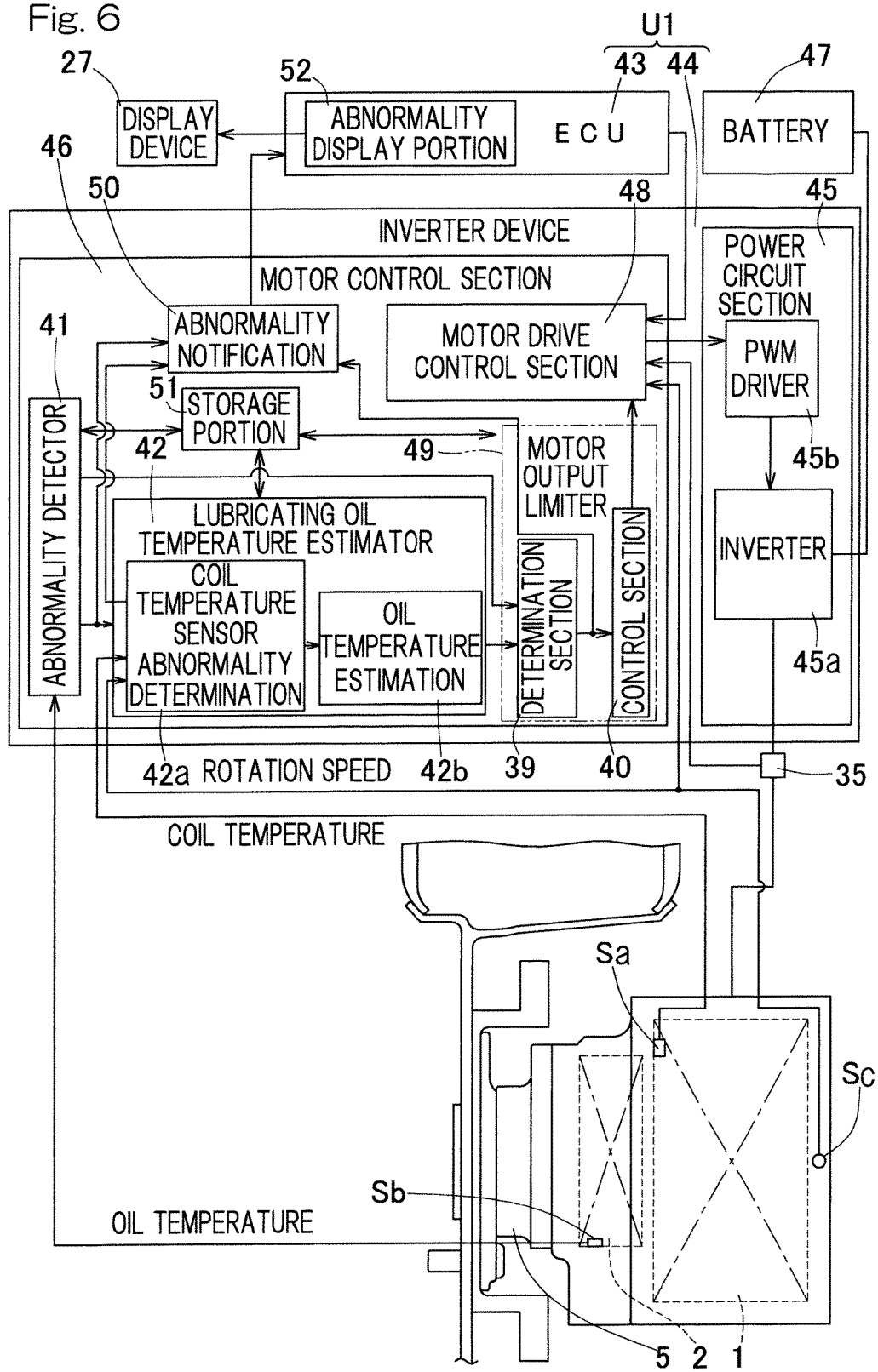
FIG. 6 is a block diagram of a control system of the motor drive device.

FIG. 5 is an enlarged view of a portion A of FIG. 4. As shown in FIGS. 4 and 5, the coil temperature sensor Sa for detecting the temperature of the motor coils 78 is disposed in one of gaps 6 between the motor coils 78 adjacent to each other in the circumferential direction in spaces between the teeth 77a, 77a adjacent to each other in the circumferential direction. The coil temperature sensor Sa is disposed close to the motor coils 78 and above a center L1 of the motor rotation shaft 6 (FIG. 1). The motor coils 78, 78 adjacent to each other, together with the coil temperature sensor Sa, are covered with the insulating member 79 formed from an insulating material.

As shown in FIG. 1, a structure is provided in which the lubricating oil supplied radially outward from the motor axis is radially emitted and sprayed from the motor rotor 10 to the coil ends 78a by the lubricating oil supply mechanism Jk. Thus, the flow rate at which the lubricating oil is emitted is low in a low rotation region, but in a high rotation region, the flow rate at which the lubricating oil is emitted is high, and the lubricating oil is sprayed to the coil ends 78a and then splatters to a partition wall or a surrounding area. When the heated lubricating oil is sprayed to the coil ends 78a, the motor coils 78 are heated by the lubricating oil.

Due to conduction of heat to the motor coil 78, the temperature around the coil temperature sensor Sa also rises, and the temperature of the coil temperature sensor Sa rises so as to follow the temperature rise of the lubricating oil. The difference between the coil temperature and the temperature of the lubricating oil at this time shifts with a temperature difference of several degrees (e.g., about 1 to 20° C.). Even in the case where the coil temperature sensor Sa is disposed between slots in order to be less likely to be influenced by the lubricating oil, the coil temperature follows a temperature rise of the lubricating oil with a certain temperature difference due to conduction of heat.

The rotation speed detection sensor Sc is provided within the motor housing 8 and detects the rotation speed of the electric motor 1. A motor drive control section 48 (FIG. 6) described later acquires the rotation angle of the motor rotor 10 from the rotation speed detection sensor Sc and performs vector control. As the rotation speed detection sensor Sc, for example, a resolver, a GMR (Giant Magneto Resistive effect) sensor, or the like can be used.

A control system will be described. FIG. 6 is a block diagram of the control system of the motor drive device. The control device U1 includes: an ECU 43 that is an electric control unit configured to perform overall control of the vehicle; and an inverter device 44 that performs control of the electric motor 1 for running in accordance with a command from the ECU 43. The inverter device 44 includes: a power circuit section 45 provided for each electric motor 1; and a motor control section 46 that controls the power circuit section 45. The motor control section 46 has a function to output, to the ECU 43, various types of information such as various detected values and control values, regarding the motor drive device, held by the motor control section 46.

The power circuit section 45 includes: an inverter 45a that converts DC power from a battery 47 into three-phase AC power to be used to drive the electric motor 1; and a PWM driver 45b that controls the inverter 45a. The inverter 45a includes a plurality of semiconductor switching elements (not shown). The PWM driver 45b performs pulse width modulation on a current command inputted thereto and provides ON/OFF command to the respective semiconductor switching elements.

The motor control section 46 is composed of: a computer including a processor; and other electronic circuits such as a ROM (read only memory) including a program to be executed by the processor, a RAM (random access memory), and a co-processor, and includes the motor drive control section 48 as a basic control section therein. The motor drive control section 48 converts an accelerating/decelerating command, represented as a torque command or the like sent from the ECU 43 which is higher-order control unit, to a current command in accordance with this command, and sends the current command to the PWM driver 45b. The motor drive control section 48 acquires a motor current applied from the inverter 45a to the electric motor 1, from a current detector 35, and performs current feedback control. In addition, as described above, the motor drive control section 48 acquires the rotation angle of the motor rotor 10 (FIG. 1) from the rotation speed detection sensor Sc (FIG. 6) and performs vector control. Specifically, the motor drive control section 48 is configured with a hardware circuit or a software function on a processor (not shown) that is capable of calculating a current command and performing current feedback control and vector control by using a LUT (Look Up Table) implemented by software or hardware, or a predetermined transform function contained in a library of software or hardware equivalent to the function (hereinafter referred to as "implementation model"), etc.

The motor control section 46 is provided with an abnormality detector 41, a lubricating oil temperature estimator 42, a motor output limiter 49, an abnormality notification section 50, and a storage portion 51. The abnormality detector 41 detects an abnormality in the lubricating oil temperature sensor Sb.

Figure 7:
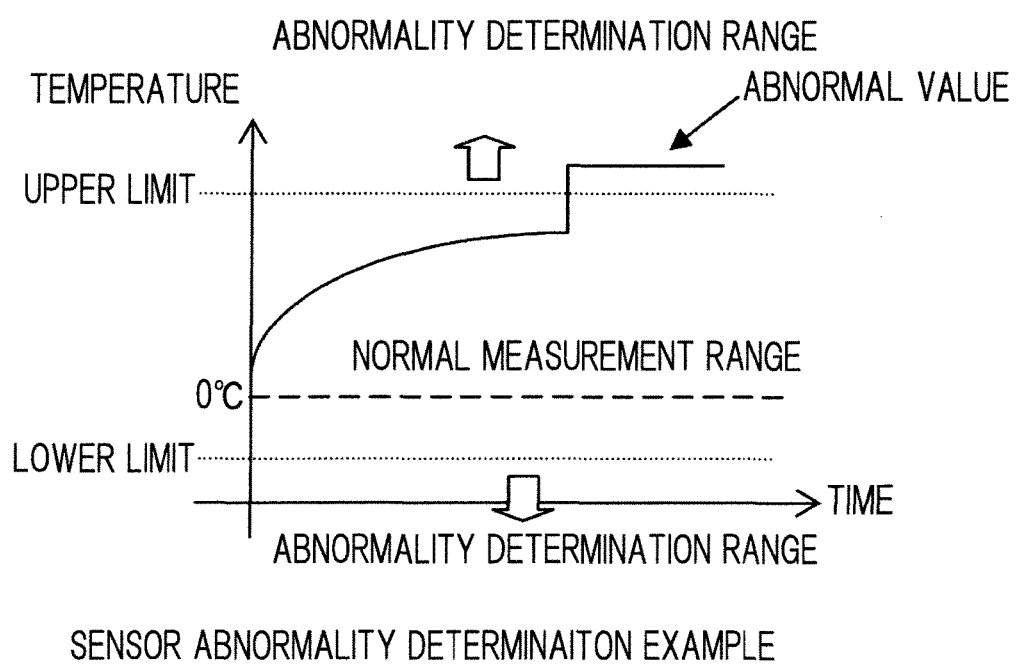
FIG. 7 is a diagram showing an example of determining an abnormality in a lubricating oil temperature sensor of the motor drive device.

FIG. 7 is a diagram showing an example of determining an abnormality in the lubricating oil temperature sensor of the motor drive device. A description will be given also with reference to FIG. 6. When the temperature of the lubricating oil (oil temperature) detected by the lubricating oil temperature sensor Sb is in an abnormality determination range higher than an a determined temperature upper limit (also referred to as "oil temperature design upper limit") or lower than a determined temperature lower limit (also referred to as "oil temperature design lower limit"), the abnormality detector 41 determines that an abnormality is present in the lubricating oil temperature sensor Sb. When the temperature of the lubricating oil is in a range between the upper and lower limits, for example inclusive, (in a normal measurement range), the abnormality detector 41 determines that the lubricating oil temperature sensor Sb is in a normal state. In abnormality detection for a wire breakage that is a representative example of a mechanical abnormality in a sensor, when the temperature of the lubricating oil is higher than the determined temperature upper limit or lower than the determined temperature lower limit, it is determined that a wire breakage is present in the sensor. The upper limit and the lower limit are determined on the basis of the results of a test, simulation, or the like, and are stored in the storage portion 51 in a rewritable manner.

When the abnormality detector 41 determines that an abnormality is present in the lubricating oil temperature sensor Sb, the abnormality detector 41 sends abnormality occurrence information corresponding to this abnormality to each of the abnormality notification section 50 and the lubricating oil temperature estimator 42. The lubricating oil temperature estimator 42 includes a coil temperature sensor abnormality determination section 42a and an oil temperature estimation section 42b. When the coil temperature sensor abnormality determination section 42a receives the abnormality occurrence information from the abnormality detector 41, the coil temperature sensor abnormality determination section 42a determines presence or absence of an abnormality in the coil temperature sensor Sa.

Similarly to the above-described example of determination as to an abnormality in the lubricating oil temperature sensor Sb, the coil temperature sensor abnormality determination section 42a determines that an abnormality is present in the coil temperature sensor Sa, when the temperature of the motor coils 78 (FIG. 1) (coil temperature) detected by the coil temperature sensor Sa is higher than a determined coil temperature upper limit (also referred to as "coil temperature design upper limit") or lower than a determined coil temperature lower limit (also referred to as "coil temperature design lower limit"). When the coil temperature sensor abnormality determination section 42a determines that an abnormality is present in the coil temperature sensor Sa, the coil temperature sensor abnormality determination section 42a sends abnormality occurrence information corresponding to this abnormality to the abnormality notification section 50.

When the coil temperature sensor abnormality determination section 42a determines that no abnormality is present in the coil temperature sensor Sa, the oil temperature estimation section 42b estimates the temperature of the lubricating oil on the basis of a determined relationship using the temperature detected by the coil temperature sensor Sa and the rotation speed detected by the rotation speed detection sensor Sc. The estimated temperature is necessary and sufficient to obtain the temperature state of the speed reducer 2, although the accuracy thereof is lower than the detection accuracy of the temperature detected by the lubricating oil temperature sensor Sb when the lubricating oil temperature sensor Sb is in a normal state. Specifically, for example, the oil temperature estimation section 42b estimates the temperature of the lubricating oil when the rotation speed of the electric motor 1 detected by the rotation speed detection sensor Sc is not less than a determined rotation speed. Furthermore, for example, the oil temperature estimation section 42b estimates the temperature of the lubricating oil with multiplying the coil temperature detected by the coil temperature sensor Sa by a correction value corresponding to the rotation speed detected by the rotation speed detection sensor Sc.

Meanwhile, loss occurring in the motor drive device is obtained by combining losses of each portion. Regarding the loss of the speed reducer 2, rolling resistance of a bearing portion and sliding resistance of a sliding portion are main losses, and both are depending on a number of rotations if bearing specifications and a gap within the speed reducer are determined. In addition, regarding the loss of the electric motor 1, iron loss, copper loss, and mechanical loss are main losses. The copper loss depends on a coil current, the iron loss depends on the coil current and a number of rotations, and the mechanical loss depends on the number of rotations. Thus, regarding the loss in a low-rotation and high-torque region, the copper loss occupies a large part of the loss; and in a high-rotation and low-torque region, the iron loss and the mechanical loss in the speed reducer occupy a large part of the loss. Accordingly, a situation where the speed reducer 2 is in an overload state and is thermally disadvantageous arises in the entirety of the high-speed region.

Therefore, when the rotation speed is not less than the determined rotation speed, where the speed reducer 2 is considered to be in a thermally disadvantageous situation, the oil temperature estimation section 42b estimates the temperature of the lubricating oil with multiplying the coil temperature detected by the coil temperature sensor Sa by the correction value corresponding to the rotation speed detected by the rotation speed detection sensor Sc, whereby the temperature state of the speed reducer 2 can be obtained in a detailed manner.

The motor output limiter 49 includes a determination section 39 and a control section 40. The determination section 39 determines whether the temperature of the lubricating oil estimated by the oil temperature estimation section 42b exceeds a threshold. The threshold for the oil temperature is determined by a test or simulation, for example, on the basis of a relationship between the oil temperature and the viscosity of the lubricating oil, and/or a relationship between the viscosity of the lubricating oil and the rotation resistance of the electric motor 1, etc. The threshold and the above determined rotation speed are stored in the storage portion 51 in a rewritable manner.

When the determination section 39 determines that the estimated oil temperature exceeds the threshold, the control section 40 commands the power circuit section 45 via the motor drive control section 48 to reduce the current of the electric motor 1. In this case, the control section 40 may reduce the motor current at a determined rate with respect to the present motor current or reduce it by a determined value. For example, when it is confirmed that the estimated lubricating oil temperature becomes equal to or less than the threshold after a certain time period after the estimated lubricating oil temperature exceeds the threshold, the control section 40 cancels output limitation on the electric motor 1.

Specifically, the determination section 39, the control section 40, the abnormality detector 41, the coil temperature sensor abnormality determination section 42a, and the oil temperature estimation section 42b are configured with a hardware circuit or a software function on a processor (not shown) that is capable of performing calculation and outputting the result similarly as described above, by using the above implementation model, or a comparison function or hardware equivalent to this, etc.

When the abnormality notification section 50 receives the abnormality occurrence information about the lubricating oil temperature sensor Sb or the coil temperature sensor Sa as described above or when the determination section 39 determines that the estimated oil temperature exceeds the threshold, the abnormality notification section 50 outputs the abnormality occurrence information to the ECU 43. Upon reception of the abnormality occurrence information outputted from the abnormality notification section 50, an abnormality display portion 52 provided to the ECU 43 causes a display device 27, provided to a console panel or the like of the vehicle, to perform a display for making a notification of the abnormality.

Figure 8:
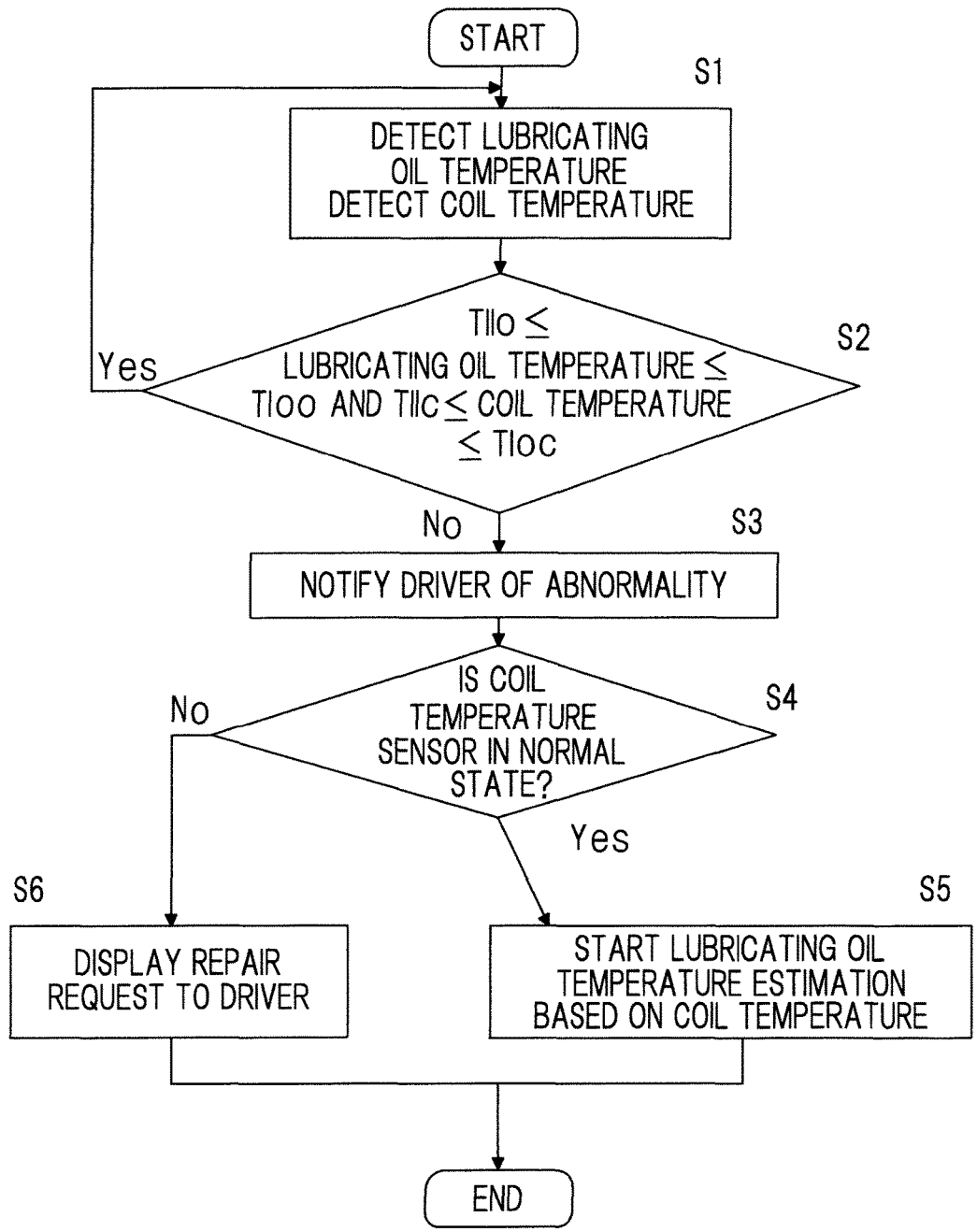
FIG. 8 is a flowchart showing an example of estimation operation of lubricating oil temperature of the motor drive device.

FIG. 8 is a flowchart showing an example of estimation operation of lubricating oil temperature of the motor drive device. A description will be given also with reference to FIG. 6. After starting of this process (start), the lubricating oil temperature sensor Sb detects the temperature of the lubricating oil, and the coil temperature sensor Sa detects the coil temperature (step S1). Next, the abnormality detector 41 performs determination as to an abnormality in the oil temperature detected by the lubricating oil temperature sensor Sb, and the coil temperature sensor abnormality determination section 42a performs determination as to an abnormality in the coil temperature detected by the coil temperature sensor Sa (step S2).

Specifically, the abnormality detector 41 determines whether the oil temperature detected by the lubricating oil temperature sensor Sb is not lower than the oil temperature design lower limit and not higher than the oil temperature design upper limit. The coil temperature sensor abnormality determination section 42a determines whether the coil temperature detected by the coil temperature sensor Sa is not lower than the coil temperature design lower limit and not higher than the coil temperature design upper limit. When it is determined that the temperatures detected by the lubricating oil temperature sensor Sb and the coil temperature sensor Sa are each not lower than the determined lower limit and not higher than the determined upper limit (in the normal measurement range: see FIG. 7) (step S2: Yes), this process returns to step S1.

When the temperature detected by either one of the sensors Sb and Sa is higher than the upper limit or lower than the lower limit (step S2: No), the abnormality notification section 50 outputs abnormality occurrence information to the ECU 43, and the abnormality display portion 52 causes the display device 27 to perform a display for making a notification of an abnormality (step S3). Next, when the abnormality detector 41 determines that an abnormality is present in the lubricating oil temperature sensor Sb and the coil temperature sensor abnormality determination section 42a determines that the coil temperature sensor Sa is in a normal state (step S4: Yes), the oil temperature estimation section 42b estimates the oil temperature of the lubricating oil by using the coil temperature sensor Sa and the rotation speed detection sensor Sc (step S5). Thereafter, this process is ended. When the coil temperature sensor abnormality determination section 42a determines that the coil temperature sensor Sa is also abnormal (step S4: No), the lubricating oil temperature estimation according to the present embodiment cannot be performed, and thus the abnormality display portion 52 causes the display device 27 to perform a display for making a notification of the abnormality (repair request), upon reception of abnormality occurrence information corresponding to this abnormality (step S6). Thereafter, this process is ended.

Figure 9:
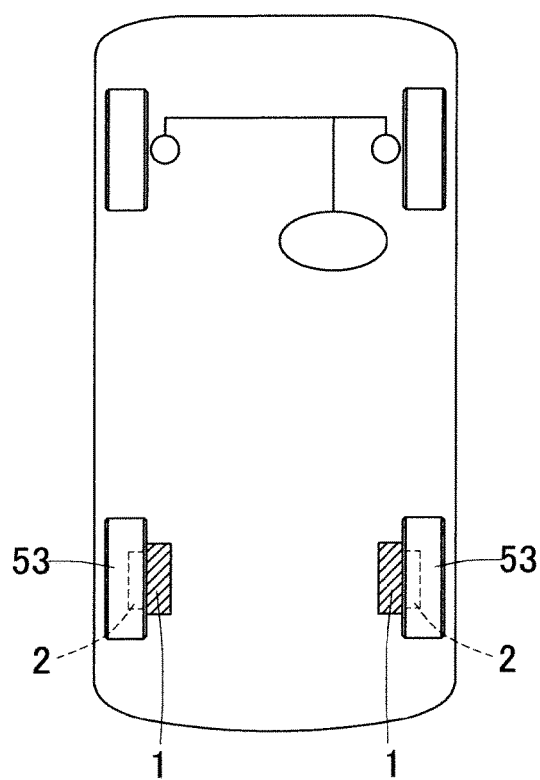
FIG. 9 is a diagram showing a schematic configuration of a vehicle in which the motor drive device is provided.

FIG. 9 is a diagram showing a schematic configuration of the vehicle in which the motor drive device of the present embodiment is provided. In the vehicle, right and left rear wheels 53, 53 are driven by independent electric motors 1, respectively. Each electric motor 1 forms an in-wheel motor drive device. Regarding the in-wheel motor drive device of this embodiment, rear-wheel drive is shown, but front-wheel drive or four-wheel drive may be employed.

According to the motor drive device described above, when the lubricating oil temperature sensor Sb is abnormal, the lubricating oil temperature estimator 42 estimates the temperature of the lubricating oil on the basis of the determined relationship using the coil temperature detected by the coil temperature sensor Sa and the rotation speed detected by the rotation speed detection sensor Sc. The estimated temperature is necessary and sufficient to obtain the temperature state of the speed reducer 2, although the accuracy thereof is lower than the detection accuracy of the temperature detected by the lubricating oil temperature sensor Sb when the lubricating oil temperature sensor Sb is in a normal state. Even when an abnormality occurs in the lubricating oil temperature sensor Sb, overload operation of the speed reducer 2 can be prevented by obtaining the temperature state of the speed reducer 2 through the temperature estimated by the lubricating oil temperature estimator 42.

Therefore, the vehicle in which the motor drive device is provided is allowed to safely move to a location where repair is possible, or the like. Especially when the rotation speed is not less than the determined rotation speed, where the speed reducer 2 is considered to be in a thermally disadvantageous situation, the temperature state of the speed reducer 2 can be obtained in a detailed manner by estimating the temperature of the lubricating oil. Accordingly, overload operation of the speed reducer 2 can be prevented.

Figure 10:
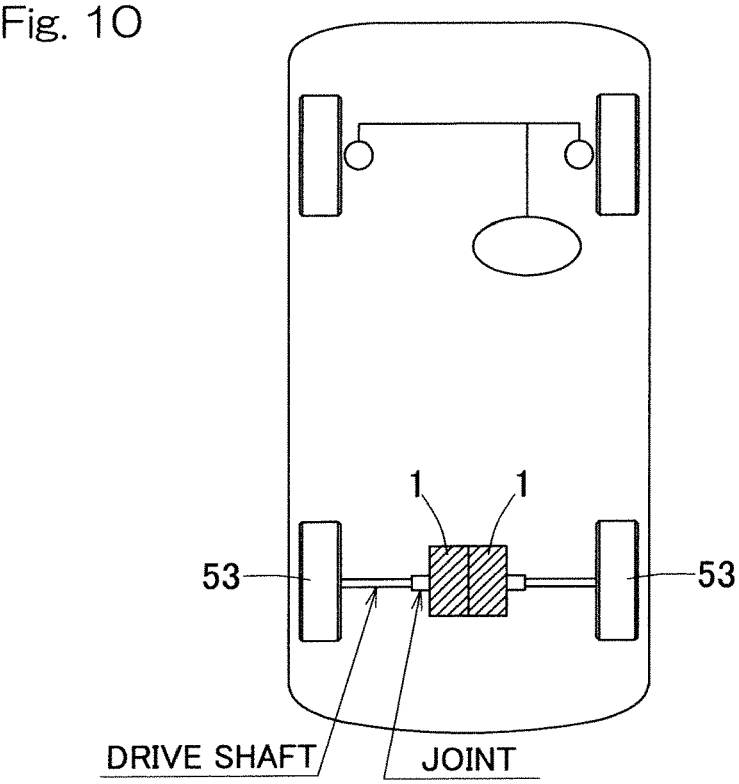
FIG. 10 is a diagram showing a schematic configuration of a vehicle in which a motor drive device according to another embodiment of the present invention is provided.

As in another embodiment shown in FIG. 10, the motor drive device may be applied to a two-motor-onboard-type electric vehicle in which two electric motors 1, 1 and speed reducers (not shown) corresponding to the respective electric motors 1 are provided in a vehicle body and right and left wheels 53, 53 are driven by these electric motors 1, 1. In this example, rear-wheel drive is shown, but front-wheel drive or four-wheel drive may be employed.

Although not shown, the motor drive device may be applied to a one-motor-type electric vehicle in which one electric motor and a speed reducer are provided in a vehicle body and right and left wheels are driven by the one electric motor. As the speed reducer of the motor drive device, the cycloidal speed reducer is used, but a planetary speed reducer, a speed reducer with two parallel shafts, or another speed reducer can be used.

The lubricating oil temperature estimator may have a correction map that determines the correction value corresponding to the rotation speed detected by the rotation speed detection sensor Sc, and may estimate the temperature of the lubricating oil by adding the correction value in the correction map to the temperature of the motor coil detected by the coil temperature sensor Sa. The correction map is stored, for example, in the storage portion.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . electric motor
2 . . . speed reducer
9 . . . motor stator
29 . . . lubricating oil passage
41 . . . abnormality detector
42 . . . lubricating oil temperature estimator
49 . . . motor output limiter
78 . . . motor coil
Jk . . . lubricating oil supply mechanism
U1 . . . control device
Sa . . . coil temperature sensor
Sb . . . lubricating oil temperature sensor
Sc . . . rotation speed detection sensor

What is claimed is:

1. A motor drive device comprising:
an electric motor;
a speed reducer configured to reduce a speed of rotation of the electric motor and transmit so reduced rotation to a wheel;
a lubricating oil supply mechanism configured to supply a lubricating oil to the speed reducer; and
a control device configured to control the electric motor, wherein
a lubricating oil temperature sensor configured to detect a temperature of the lubricating oil is provided in a lubricating oil passage in the speed reducer, a coil temperature sensor configured to detect a temperature of a motor coil is provided in a stator of the electric motor, and a rotation speed detection sensor configured to detect a rotation speed of the electric motor is provided, and
the control device includes
an abnormality detector configured to detect an abnormality in the lubricating oil temperature sensor, and
a lubricating oil temperature estimator configured to estimate the temperature of the lubricating oil on the basis of a determined relationship using the temperature detected by the coil temperature sensor and the rotation speed detected by the rotation speed detection sensor, when the abnormality detector detects the abnormality in the lubricating oil temperature sensor.

2. The motor drive device as claimed in claim 1, wherein the abnormality detector determines that the lubricating oil temperature sensor is abnormal, when the temperature of the lubricating oil detected by the lubricating oil temperature sensor deviates from a range between determined temperature upper and lower limits.

3. The motor drive device as claimed in claim 1, wherein the lubricating oil temperature estimator estimates the temperature of the lubricating oil when the rotation speed of the electric motor detected by the rotation speed detection sensor is not less than a determined rotation speed.

4. The motor drive device as claimed in claim 1, wherein the lubricating oil temperature estimator estimates the temperature of the lubricating oil by multiplying the temperature of the motor coil, detected by the coil temperature sensor, by a correction value corresponding to the rotation speed, detected by the rotation speed detection sensor.

5. The motor drive device as claimed in claim 1, wherein the control device includes a motor output limiter configured to limit a current of the electric motor when the temperature of the lubricating oil estimated by the lubricating oil temperature estimator exceeds a threshold.

* * * * *